United States Patent
Warren et al.

(10) Patent No.: US 12,553,796 B2
(45) Date of Patent: *Feb. 17, 2026

(54) MEASUREMENT SYSTEM HAVING A PROBE FOR MEASURING PARAMETERS OF A TURBINE ENGINE

(71) Applicant: RTX Corporation, Farmington, CT (US)

(72) Inventors: Eli Warren, Wethersfield, CT (US); Bryan J. Hackett, Berlin, CT (US)

(73) Assignee: RTX Corporation, Farmington, CT (US)

( * ) Notice: Subject to any disclaimer, the term of this patent is extended or adjusted under 35 U.S.C. 154(b) by 258 days.

This patent is subject to a terminal disclaimer.

(21) Appl. No.: 18/121,430

(22) Filed: Mar. 14, 2023

(65) Prior Publication Data
US 2024/0310246 A1    Sep. 19, 2024

(51) Int. Cl.
*G01M 15/14*    (2006.01)

(52) U.S. Cl.
CPC .................. *G01M 15/14* (2013.01)

(58) Field of Classification Search
CPC .......... G01D 5/24; G01D 5/268; G01M 15/14
See application file for complete search history.

(56) References Cited

U.S. PATENT DOCUMENTS

| | | | |
|---|---|---|---|
| 4,384,819 A * | 5/1983 | Baker | G01S 13/36 415/118 |
| 4,666,297 A * | 5/1987 | Suarez-Gonzalez | G01J 5/0801 374/127 |
| 5,349,850 A * | 9/1994 | Young | G02B 6/3624 73/112.01 |
| 2005/0280412 A1 | 12/2005 | Roeseler | |
| 2014/0270625 A1 * | 9/2014 | Warren | G01L 1/242 385/12 |
| 2015/0092039 A1 * | 4/2015 | Ruhge | G01N 21/8803 348/82 |
| 2015/0300920 A1 * | 10/2015 | DeAscanis | G01M 15/14 356/614 |

(Continued)

FOREIGN PATENT DOCUMENTS

| | | |
|---|---|---|
| CN | 113310421 A | 8/2021 |
| CN | 113358205 A | 9/2021 |

(Continued)

OTHER PUBLICATIONS

EP Search Report for EP Patent Application No. 24163591.1 dated Jul. 9, 2024.

(Continued)

*Primary Examiner* — Eric S. McCall
(74) *Attorney, Agent, or Firm* — Getz Balich LLC (57) ABSTRACT

A measurement system is provided that includes a probe housing, a field probe and an optical probe. The probe housing includes a sidewall, a cavity and a channel. The sidewall extends circumferentially around and axially along the cavity. The channel is radially outboard of the cavity and extends axially in the sidewall. The field probe includes a field sensor disposed in the cavity. The field sensor forms a sensor face. The optical probe is configured with an optical line of sight through the channel into a volume adjacent the sensor face.

16 Claims, 9 Drawing Sheets

(56) References Cited

U.S. PATENT DOCUMENTS

| | | | |
|---|---|---|---|
| 2015/0341600 A1* | 11/2015 | Hatcher, Jr. | H04N 23/50 |
| | | | 348/82 |
| 2018/0209296 A1* | 7/2018 | DeAscanis | F01D 21/003 |
| 2019/0257705 A1* | 8/2019 | Warren | F02K 3/06 |
| 2019/0383594 A1 | 12/2019 | Warren | |
| 2021/0102901 A1* | 4/2021 | Budnicki | G02B 6/02042 |
| 2024/0255383 A1* | 8/2024 | Warren | G01D 5/24 |
| 2024/0310599 A1* | 9/2024 | Hackett | G02B 6/50 |

FOREIGN PATENT DOCUMENTS

| | | |
|---|---|---|
| CN | 114894858 A | 8/2022 |
| DE | 102019102965 A1 | 8/2020 |
| GB | 2449709 A | 12/2008 |

OTHER PUBLICATIONS

Chana, "Combined Blade Vibration and Surge/Stall Sensor for Gas Turbine Blade Health Management", Oxford Thermo-Fluids Institute, Department of Engineering Science, University of Oxford, United Kingdom, Nov. 22, 2018.

\* cited by examiner

MEASUREMENT SYSTEM HAVING A PROBE FOR MEASURING PARAMETERS OF A TURBINE ENGINE

BACKGROUND OF THE DISCLOSURE

1. Technical Field

This disclosure relates generally to measuring multiple operational parameters of, for example, a gas turbine engine rotor.

2. Background Information

Systems are known in the art for measuring operational parameters of a rotor within a gas turbine engine. Such systems include capacitance measurement systems and optical measurement systems. While these known measurement systems have various benefits, there is still room in the art for improvement. There is a need in the art, in particular, for a measurement system which can measure multiple operational parameters.

SUMMARY OF THE DISCLOSURE

According to an aspect of the present disclosure, a measurement system is provided that includes a probe housing, a field probe and an optical probe. The probe housing includes a sidewall, a cavity and a channel. The sidewall extends circumferentially around and axially along the cavity. The channel is radially outboard of the cavity and extends axially in the sidewall. The field probe includes a field sensor disposed in the cavity. The field sensor forms a sensor face. The optical probe is configured with an optical line of sight through the channel into a volume adjacent the sensor face . . . .

According to another aspect of the present disclosure, another measurement system is provided that includes a probe housing, a field probe and an optical probe. The probe housing includes a cavity and a channel discrete from the cavity. The field probe includes a field sensor disposed in the cavity. The field sensor includes a sensor face. The optical probe includes an optical fiber extending through the channel. The optical probe is configured with an optical line of sight through the optical fiber into a volume adjacent the sensor face and an end of the probe housing.

According to still another aspect of the present disclosure, another measurement system is provided that includes a probe housing, a blade tip clearance measurement system and a blade time of arrival measurement system. The probe housing includes a cavity. The blade tip clearance measurement system includes a first probe. The first probe includes a first probe sensor that forms a sensor face. The first probe sensor is disposed in the cavity. The blade time of arrival measurement system includes a second probe. The second probe projects through the probe housing to an end of the probe housing adjacent the sensor face. The second probe is configured discrete from the first probe.

The first probe sensor may be configured as or otherwise include a field probe. In addition or alternatively, the second probe may be configured as or otherwise include an optical probe.

The measurement system may also include a blade tip clearance measurement system and/or a blade time of arrival measurement system. The blade tip clearance measurement system may include the field probe. The blade time of arrival measurement system may include the optical probe.

The measurement system may also include a blade tip clearance measurement system comprising the field probe.

The measurement system may also include a blade time of arrival measurement system comprising the optical probe.

The optical probe may include an optical fiber at least partially defining the optical line of sight into the volume. The optical fiber may extend axially in the channel.

The optical fiber may extend through the probe housing to or into the volume.

The optical probe may also include an optical sheath. The optical sheath may cover a first portion of the optical fiber and may be connected to the probe housing. A second portion of the optical fiber, within the channel, may project out from the optical sheath towards the volume.

The optical sheath may be a first optical sheath. The optical probe may also include a second optical sheath. The second optical sheath may cover a third portion of the optical fiber and may be connected to the probe housing. The second portion of the optical fiber may be between the first portion of the optical fiber and the third portion of the optical fiber.

The optical probe may also include an optical sheath. The optical sheath may cover at least a portion of the optical fiber. The optical sheath may extend through the channel and to or into the volume.

The optical fiber may be a first optical fiber. The optical probe may also include a second optical fiber at least partially defining a second optical line of sight into the volume. The second optical fiber may extend axially in the channel.

The channel may be an optical channel. The probe housing may also include a fluid channel adjacent the optical channel within the sidewall. The fluid channel may be radially outboard of the cavity and extend axially in the sidewall.

The measurement system may also include a working fluid source fluidly coupled with the fluid channel.

The probe housing may also include a receptacle at an end of the probe housing. The optical channel and the fluid channel may each project axially into the probe housing from the receptacle.

The fluid channel may be a first fluid channel. The probe housing may also include a second fluid channel adjacent the optical channel within the sidewall. The second fluid channel may project axially into the probe housing from the receptacle.

The optical channel may be laterally between the first fluid channel and the second fluid channel.

The optical channel and the fluid channel may each extend axially in the probe housing to an end of the probe housing at the sensor face.

The probe housing may also include a mount projecting out from the sidewall. A fastener aperture may extend axially through the mount.

The field probe may be configured as or otherwise include a capacitance probe. The field sensor may be configured as or otherwise include a capacitance sensor.

The field probe may be configured as or otherwise include an eddy-current probe. The field sensor may be configured as or otherwise include an eddy-current sensor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
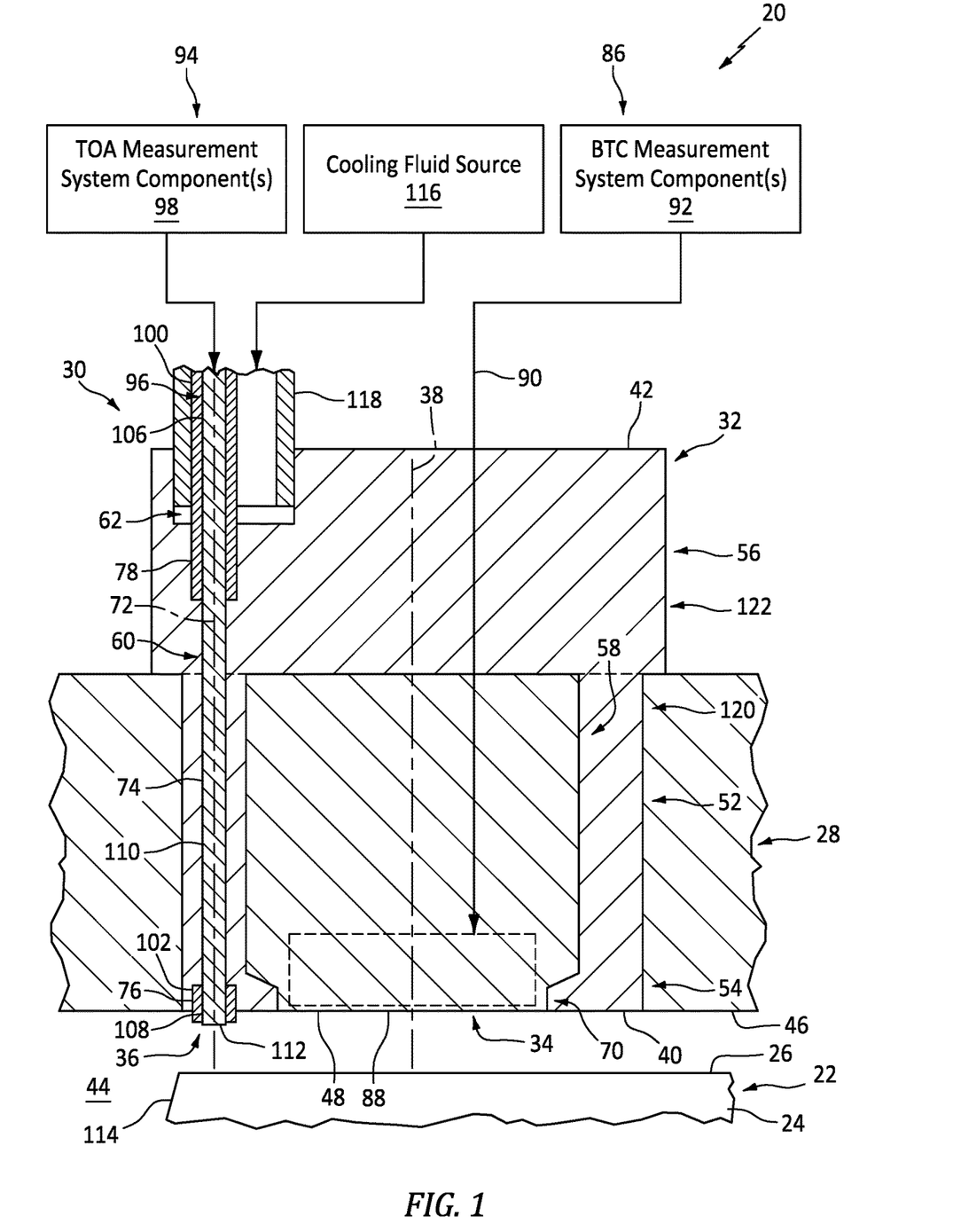
FIG. 1 is a partial schematic sectional illustration of a measurement system.

FIG. 1 illustrates a system 20 for measuring multiple operational parameters of a rotor. This rotor may be a bladed rotor 22 for a gas turbine engine. Examples of the bladed rotor 22 include, but are not limited to, a propulsor rotor (e.g., a fan rotor), a compressor rotor or any other ducted rotor within and/or rotatably driven by the gas turbine engine. The present disclosure, however, is not limited to measuring operational parameters for a bladed rotor, nor to measuring operational parameters for gas turbine engine applications. The measurement system 20, for example, may alternatively be configured to measure operational parameters of any rotor in or coupled to various other types of rotational equipment such as, but not limited to, a reciprocating piston engine, a rotary engine, an electric motor and the like. However, for ease of description, the measurement system 20 is described below with reference to the bladed rotor 22.

The operation parameters may include a blade tip clearance (BTC) and a blade time of arrival (BTOA) for one or more rotor blades 24 of the bladed rotor 22. The blade tip clearance may be indicative of a (e.g., minimum or average) radial distance between a tip 26 of one of the rotor blades 24 and a duct wall 28 circumscribing and housing the bladed rotor 22. The blade time of arrival may be indicative of a point in time when the tip 26 (or another portion) of one of the rotor blades 24 arrives at or crosses (e.g., passes) a measurement location. The present disclosure, however, is not limited to such exemplary operational parameters.

The measurement system 20 includes a probe assembly 30 arranged with the duct wall 28. This probe assembly 30 includes a probe housing 32, a capacitance probe 34 and an optical probe 36.

Figure 2:
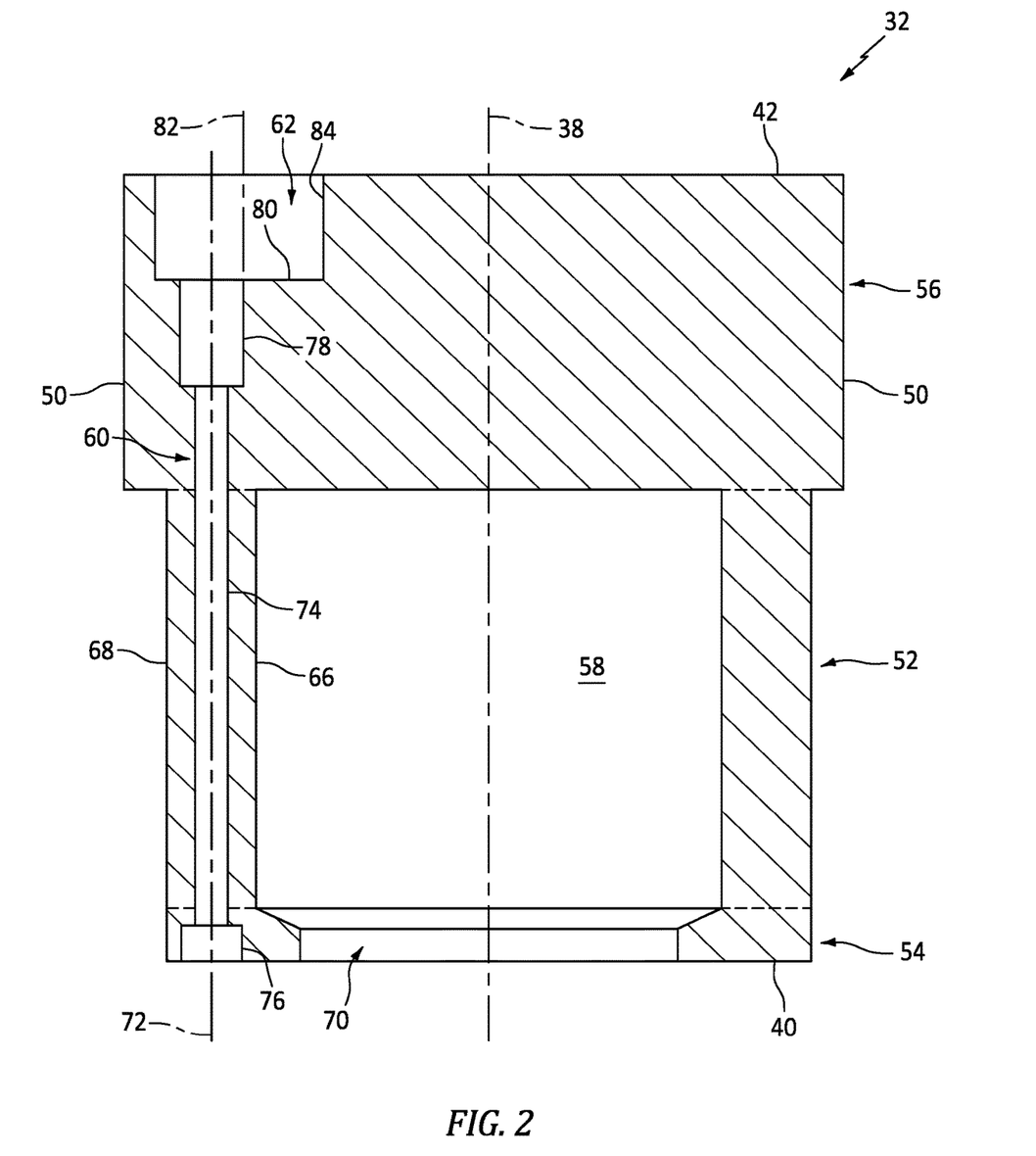
FIG. 2 is a sectional illustration of a probe housing.

Referring to FIG. 2, the probe housing 32 extends axially along an axial centerline 38 between and to a face end 40 (e.g., an interior end) of the probe housing 32 and a back end 42 (e.g., an exterior end) of the probe housing 32, which axial centerline 38 may be or may be parallel with an axial centerline of the probe housing 32. Referring to FIG. 1, the housing face end 40 is configured to face a volume 44 within the duct wall 28; e.g., a flowpath in which the bladed rotor 22 and its rotor blades 24 are disposed. Briefly, a radial outer peripheral boundary of the volume 44 in FIG. 1 is formed by an interior side 46 of the duct wall 28, the housing face end 40 and a sensor face 48 of the capacitance probe 34.

Referring again to FIG. 2, the probe housing 32 projects radially out from the axial centerline 38 to an outer side 50 of the probe housing 32.

Figure 3:
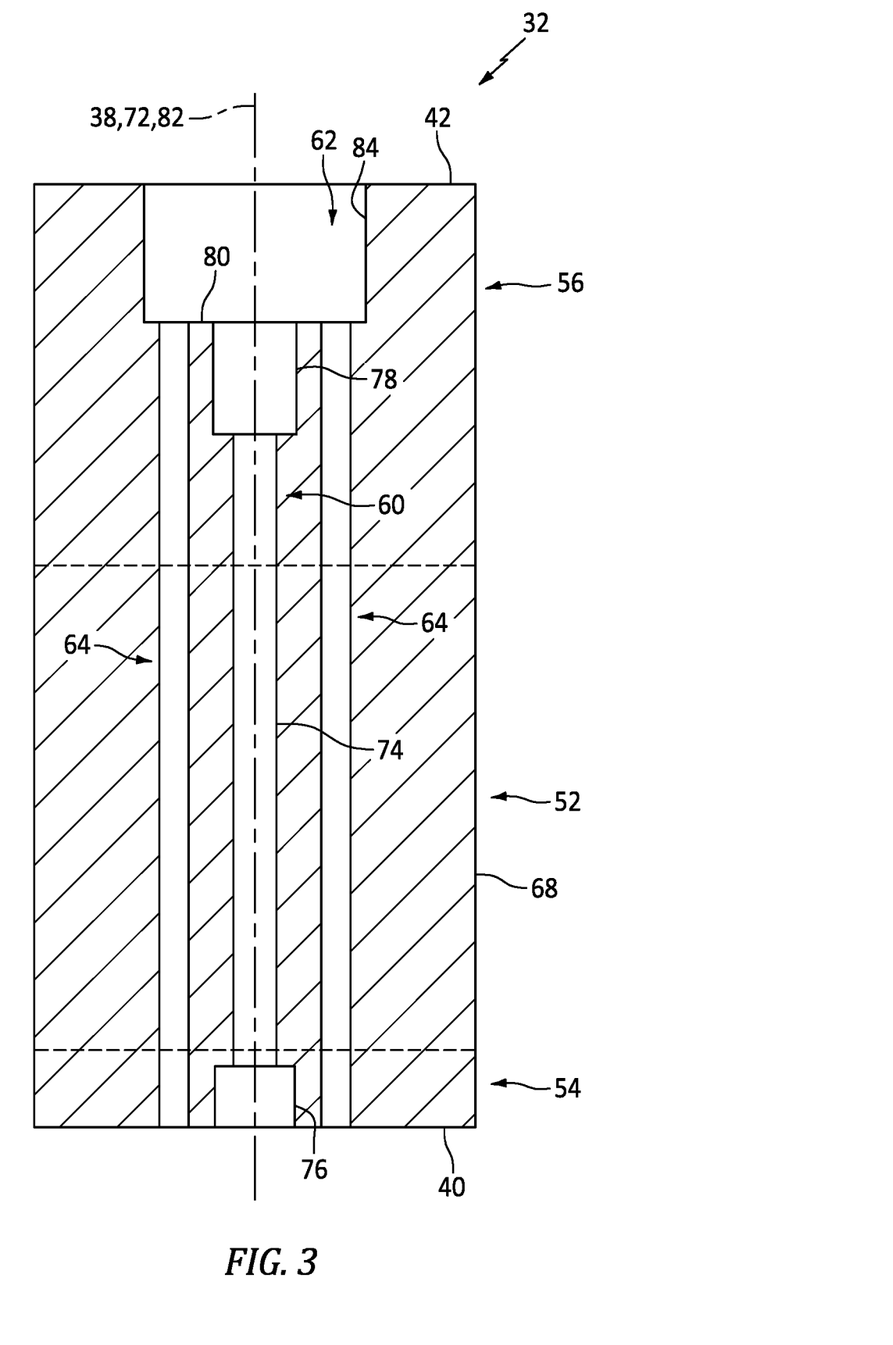
FIG. 3 is another sectional illustration of the probe housing taken along line 3-3 in FIG. 4.

The probe housing 32 of FIG. 2 includes a housing sidewall 52, a housing face-end endwall 54 ("face endwall"), a housing back-end endwall 56 ("back endwall"), an internal cavity 58 and an optical channel 60. Referring to FIG. 3, the probe housing 32 may also include a receptacle 62 and/or one or more working fluid channels 64; e.g., cooling and/or purge fluid channels.

Figure 4:
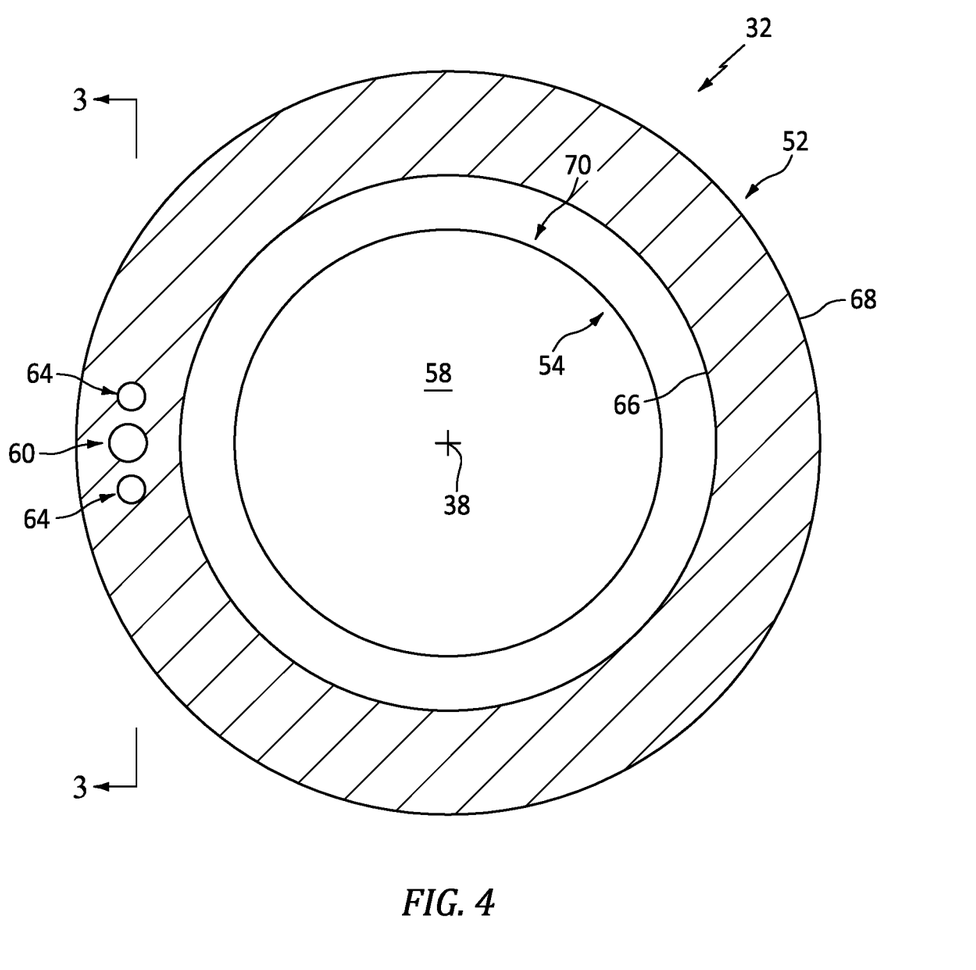
FIG. 4 is a cross-sectional illustration of the probe housing.

Referring to FIG. 2, the sidewall 52 extends axially along the axial centerline 38 between and to the face endwall 54 and the back endwall 56. The sidewall 52 is also connected to (e.g., formed integral with or attached to) the face endwall 54 and/or the back endwall 56. The sidewall 52 extends radially between and to an inner side 66 of the sidewall 52 and an outer side 68 of the sidewall 52. The sidewall outer side 68 may be arranged at (e.g., on, adjacent or proximate) the housing outer side 50. The sidewall outer side 68 of FIG. 2, for example, is (e.g., slightly) recessed radially inward from the housing outer side 50. Of course, in other embodiments, the sidewall outer side 68 may alternatively be radially aligned with (e.g., at least partially forms) the housing outer side 50. Referring to FIG. 4, the sidewall 52 extends (e.g., completely) circumferentially around the axial centerline 38. The sidewall 52 may thereby be provided with a full-hoop tubular geometry.

The sidewall 52 may form an outer peripheral boundary of the housing cavity 58 within the probe housing 32. The housing cavity 58 of FIG. 4, for example, projects radially out from the axial centerline 38 to the sidewall inner side 66. Referring to FIG. 2, the housing cavity 58 extends axially along the axial centerline 38 within the probe housing 32/along the sidewall inner side 66 between and to the face endwall 54 and the back endwall 56, which axial centerline 38 may be or may be parallel with an axial centerline of the housing cavity 58.

The face endwall 54 is disposed at the housing face end 40. The face endwall 54 of FIG. 2, for example, extends axially along the axial centerline 38 from the sidewall 52 to the housing face end 40. The face endwall 54 extends radially out to an outer side aligned with and/or part of the sidewall outer side 68. The face endwall 54 may form an open end of the housing cavity 58. The face endwall 54 of FIG. 2, for example, includes a cavity port 70; e.g., a through-hole. This cavity port 70 projects axially along the axial centerline 38 from the housing face end 40, through the face endwall 54, to the housing cavity 58. The cavity port 70 of FIG. 2 thereby provides a window (e.g., a pass-through) from an exterior of the probe housing 32 into the housing cavity 58. In general, a size (e.g., diameter) of the cavity port 70 is sized smaller than a size (e.g., diameter) of the housing cavity 58; however, the present disclosure is not limited to such an exemplary arrangement.

The back endwall 56 is disposed at the housing back end 42. The back endwall 56 of FIG. 2, for example, extends axially along the axial centerline 38 from the sidewall 52 to the housing back end 42. The back endwall 56 projects radially out from the axial centerline 38 to (or about) the housing outer side 50. The back endwall 56 may form a blind end (e.g., closed-off end) of the housing cavity 58. The back endwall 56 of FIG. 2, for example, extends laterally (e.g., diametrically) across the housing cavity 58. The back endwall 56 may thereby cap off (e.g., enclose, cover, seal off, etc.) the housing cavity 58 proximate the housing back end 42.

The optical channel 60 is formed (e.g., embedded) within the probe housing 32 and one or more of its housing members 52, 54 and/or 56. The optical channel 60 of FIG. 2, for example, is located radially outboard of and separate (e.g., fluidly discrete) from the housing cavity 58. The optical channel 60 extends axially along the axial centerline 38 in the probe housing 32 and its housing members 52, 54 and 56. Briefly, the axial centerline 38 is laterally offset from and may be parallel with an axial centerline 72 of the optical channel 60. This optical channel centerline 72 may have a straight line trajectory along an entirety of the optical channel 60.

The optical channel 60 of FIG. 2 includes a channel bore 74, a face-end counterbore 76 and a back-end counterbore 78. The channel bore 74 extends axially along the axial centerline 38, 72 within the probe housing 32 between and to the face-end counterbore 76 and the back-end counterbore 78. The channel bore 74 of FIG. 2, for example, extends axially through the sidewall 52. A face-end portion of the channel bore 74 projects partially into the face endwall 54 to the face-end counterbore 76. A back-end portion of the channel bore 74 projects partially into the back endwall 56 to the back-end counterbore 78. The face-end counterbore 76 projects axially into the face endwall 54 from the housing face end 40 to the channel bore 74 and its face-end portion. At the intersection between the face-end counterbore 76 and the channel bore 74, an annular shelf projects radially out from an outer periphery of the channel bore 74 to an outer periphery of the face-end counterbore 76. The back-end counterbore 78 projects axially into the back endwall 56 from the receptacle 62 to the channel bore 74 and its back-end portion. At the intersection between the back-end counterbore 78 and the channel bore 74, an annular shelf projects radially out from the outer periphery of the channel bore 74 to an outer periphery of the back-end counterbore 78. Each member 74, 76, 78 of the optical channel 60 projects radially out from the optical channel centerline 72 to a (e.g., cylindrical) surface forming its respective outer periphery.

Referring to FIG. 3, the receptacle 62 may be configured as a recess or other indentation in the back endwall 56. The receptacle 62 of FIG. 3, for example, projects axially along the axial centerline 38, 72 into the back endwall 56 from the housing back end 42 to one or more of the channels 60 and/or 64. More particularly, the receptacle 62 of FIG. 3 extends axially into the back endwall 56 to a receptacle end surface 80, where openings to each of the channels 60, 64 are formed in the receptacle end surface 80. Briefly, the axial centerline 38, 72 may be laterally offset (see FIG. 2) from and may be parallel with an axial centerline 82 of the receptacle 62. The receptacle 62 projects radially out from the receptacle centerline 82 to a (e.g., cylindrical) surface 84 forming an outer periphery of the receptacle 62.

Each fluid channel 64 is formed (e.g., embedded) within the probe housing 32 and one or more of its housing members 52, 54 and/or 56. Each fluid channel 64, for example, is located radially outboard of and separate (e.g., fluidly discrete) from the housing cavity 58 (see FIG. 3). Each fluid channel 64 extends axially along the axial centerline 38, 72 in the probe housing 32 and its housing members 52, 54 and 56. Briefly, the axial centerline 38, 72 is laterally offset from and may be parallel with an axial centerline of each fluid channel 64. Each fluid channel centerline may have a straight line trajectory along an entirety of the respective fluid channel 64. Each fluid channel 64 of FIG. 3 may be configured as or otherwise include a bore in/through the probe housing 32.

Figure 5:
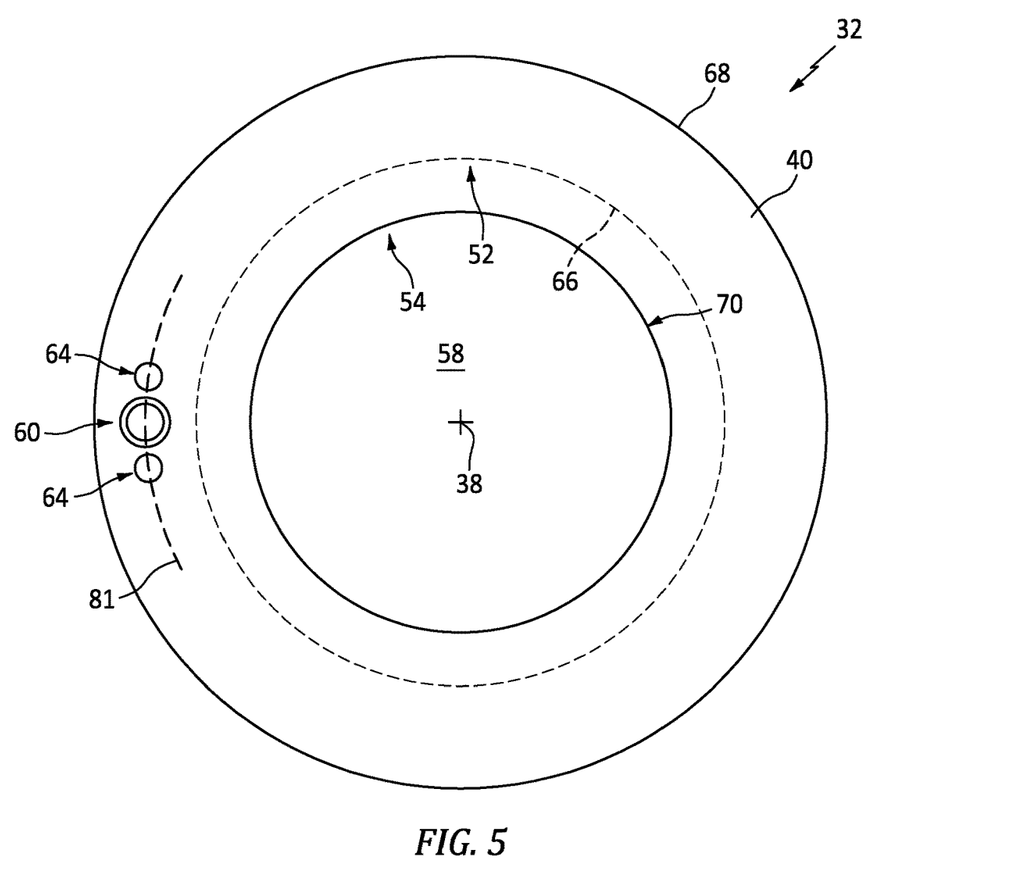
FIG. 5 is an illustration of a face-end of the probe housing.
Figure 6:
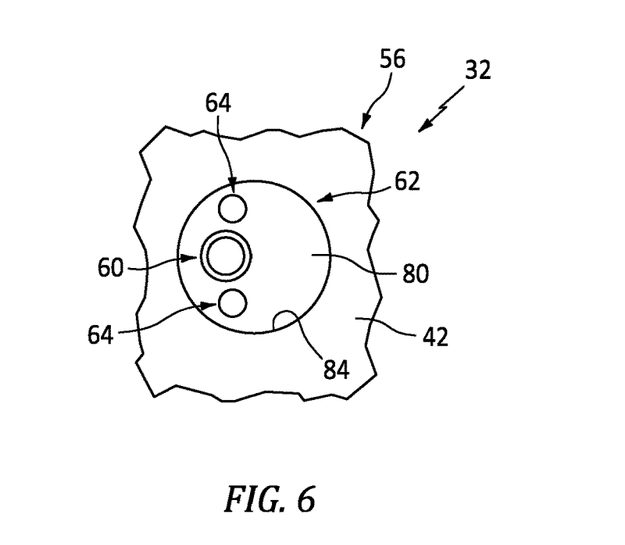
FIG. 6 is an illustration of a portion of a back-end of the probe housing.

Referring to FIGS. 5 and 6, each fluid channel 64 is spaced from and fluidly decoupled from the optical channel 60 between the receptacle 62 and the volume 44 (see FIG. 1). The optical channel 60 of FIGS. 5 and 6, for example, is arranged (e.g., circumferentially) between and spaced from the fluid channels 64. The centerlines of the channels 60 and 64 may be radially aligned along a circular reference line 81 extending about the axial centerline 38; however, the present disclosure is not limited to such an exemplary arrangement.

Figure 7:
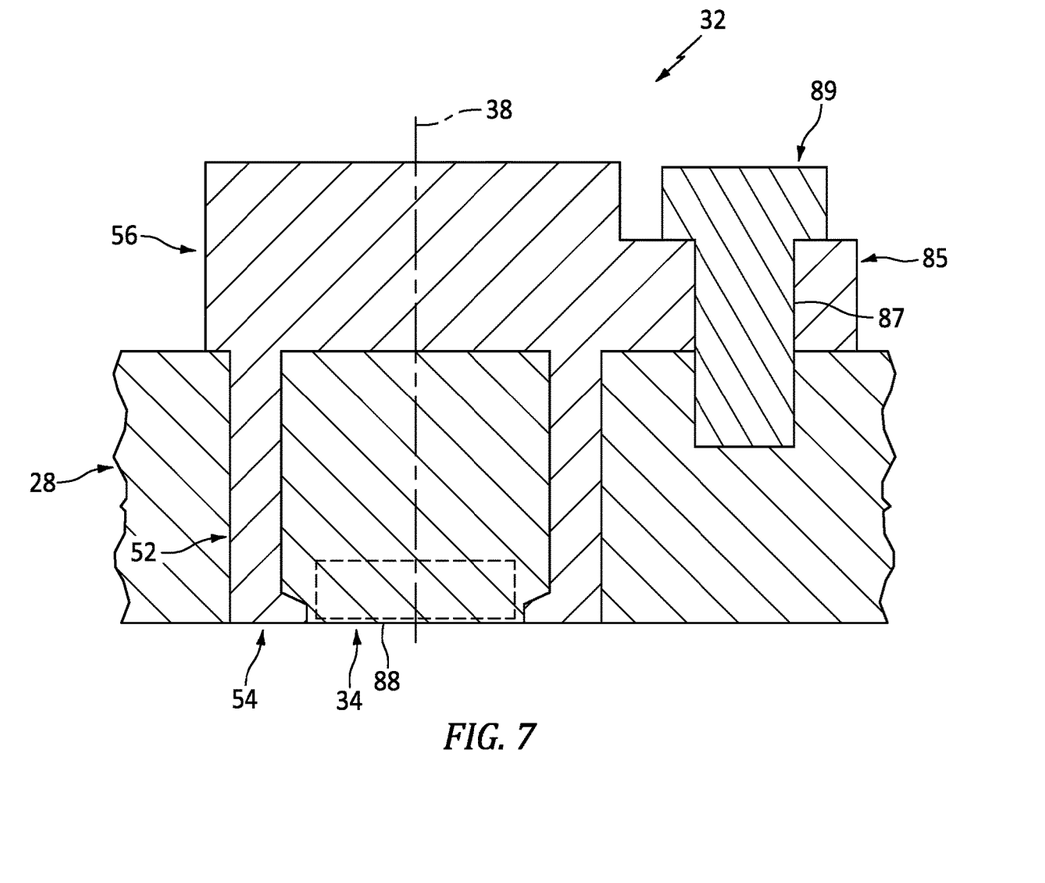
FIG. 7 is another partial sectional illustration of the measurement system.

Referring to FIG. 1, the probe housing 32 and its members 52 and 54 may be inserted into an aperture in the duct wall 28. The probe housing 32 may thereby extend across the duct wall 28 to the volume 44. The probe housing 32 may be welded, brazed, adhered and/or otherwise bonded to the duct wall 28. Alternatively, the probe housing 32 may be mechanically fastened to the duct wall 28. For example, referring to FIG. 7, the probe housing 32 may also include a mount 85; e.g., a mounting flange or tab. This mount 85 is connected to the back endwall 56, and the mount 85 projects laterally out (e.g., is cantilevered) from the back endwall 56 and/or sidewall 52 to a distal end. The mount 85 of FIG. 7 includes a fastener aperture 87 which extends axially through the mount 85. With this arrangement, a fastener 89 (e.g., a bolt) may project through the fastener aperture 87 and into a fastener aperture in the duct wall 28 to secure the probe housing 32 to the duct wall 28. The present disclosure, however, is not limited to the foregoing exemplary probe housing attachment techniques.

Referring to FIG. 1, the capacitance probe 34 is included as part of a first measurement subsystem 86 of the measurement system 20. This first measurement subsystem 86 may be configured as a blade tip clearance (BTC) measurement system for measuring the blade tip clearance. However, it is contemplated the capacitance probe 34 may also or alternatively be included as part of one or more other measurement system subsystems for measuring one or more other operational parameters associated with the bladed rotor 22. The capacitance probe 34 of FIG. 1 includes a capacitance sensor 88 and an electrical conduit 90 (e.g., a coaxial lead, a triaxial lead, multiple conductors within a common outer sheath, etc.) placing the capacitance sensor 88 in signal communication with one or more other components 92 (e.g., a signal transducer, a processor, etc.) of the first measurement subsystem 86.

The capacitance sensor 88 is configured as an electrically conductive capacitor member with a capacitor plate. This capacitance sensor 88 is arranged within and attached to the probe housing 32. The capacitance sensor 88 of FIG. 1, for example, is at least partially housed within the housing cavity 58, and its capacitor plate may be seated in the cavity port 70. The capacitance sensor 88 extends axially along the axial centerline 38 to the sensor face 48. This sensor face 48 is formed by the capacitance sensor 88 and its capacitor plate. The capacitance sensor 88 is electrically coupled to the electrical conduit 90. A single conductor (or multiple conductors) of the electrical conduit 90, for example, may project into the probe housing 32, and this conductor (or multiple conductors) may be directly or indirectly electrically coupled to the capacitance sensor 88 through a bonded connection, a mechanical connection and/or otherwise.

The optical probe 36 is included as part of a second measurement subsystem 94 of the measurement system 20, which second measurement subsystem 94 may be of a different type and/or configuration than the first measurement subsystem 86. This second measurement subsystem 94 may be configured as a blade time of arrival (BTOA) measurement system for measuring the blade time of arrival.

However, it is contemplated the optical probe 36 may also or alternatively be included as part of one or more other measurement system subsystems for measuring one or more other operational parameters associated with the bladed rotor 22. The optical probe 36 of FIG. 1 includes sensor optics 96 in signal communication with one or more other components 98 (e.g., a light emission device such as an LED, a light sensing device such as a light receptor, a processor, etc.) of the second measurement subsystem 94. The optical probe 36 also includes a back-end optical sheath 100 and a face-end optical sheath 102. Briefly, each optical sheath 100, 102 may be configured as or otherwise include a length of hypo-tubing, insulative tubing, etc.

Figure 8:
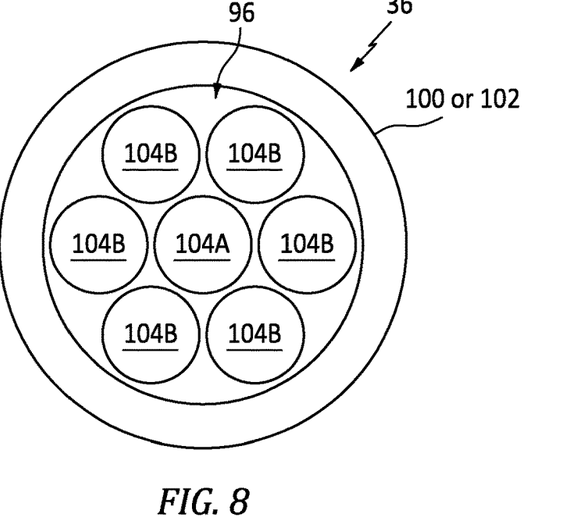
FIG. 8 is a cross-sectional illustration of sensor optics within an optical sheath.

Referring to FIG. 8, the sensor optics 96 may include a bundle of one or more optical fibers 104A and 104B (generally referred to as "104"). The optical fiber 104A may be configured for directing light into the volume 44. The optical fibers 104B may be configured for receiving light from the volume 44. Here, the optical fiber 104A is centered within the bundle and the other optical fibers 104B are distributed circumferentially about the optical fiber 104A. The present disclosure, however, is not limited to such an exemplary sensor optics arrangement.

Referring to FIG. 1, the sensor optics 96 may include a back-end portion 106, a face-end portion 108 and an intermediate portion 110. The back-end portion 106 of FIG. 1 is housed within (e.g., covered by, extends within, etc.) and may be bonded to the back-end optical sheath 100. This back-end optical sheath 100 projects into the back-end counterbore 78 and may be attached (e.g., brazed, adhered or otherwise bonded) to the probe housing 32 and its back endwall 56. The face-end portion 108 of FIG. 1 is housed within (e.g., covered by, extends within, etc.) and may be bonded to the face-end optical sheath 102. This face-end optical sheath 102 projects into the face-end counterbore 76 and may be attached (e.g., brazed, adhered or otherwise bonded) to the probe housing 32 and its face endwall 54. The intermediate portion 110 extends axially in the optical channel 60 and, more particularly extends axially through the channel bore 74 between and to the back-end portion 106 and the face-end portion 108. With this arrangement, the sensor optics 96 and its optical fibers 104 (see FIG. 8) are attached to the probe housing 32, and extend axially through the probe housing 32 and its optical channel 60 to an end 112 of the sensor optics 96 at the sensor face 48 and/or the housing face end 40. This provides the sensor optics 96 and, more particularly, each of its optical fibers 104 (see FIG. 8) with an optical line of sight axially through the probe housing 32 and its optical channel 60 into the volume 44 adjacent the sensor face 48/the housing face end 40.

The probe assembly 30 of FIG. 1 facilitates arranging multiple different probes at a common location along the duct wall 28. With such an arrangement, multiple probe assemblies 30 and, thus, multiple capacitance probes 34 and multiple optical probes 36 may be provided for monitoring the same bladed rotor 22. This may increase measurement system accuracy as well as provide redundancy. By contrast, if the capacitance probes 34 and the optical probes 36 were discretely arranged, only half the number of probes could be utilized when utilizing the same locations as the multiple probe assemblies 30. Furthermore, it may be beneficial to take NSMS measurements at or near a leading edge 114 of the respective rotor blade 24, whereas it may be beneficial to take BTC measurements at an intermediate location (e.g., middle third) along the respective blade tip 26. By laterally offsetting the optical probe 36 and the capacitance probe 34, the optical probe 36 may be positioned at or near the leading edges 114 of the rotor blades 24 and the capacitance probe 34 may be positioned at or near the intermediate location.

To provide cooling for the optical probe 36 and/or purging debris out of a gap between the probe(s) 34 and/or 36 and a respective rotor blade 24 and its blade tip 26, the fluid channels 64 (see FIGS. 3 and 4) may be fluidly coupled to a working fluid source 116; e.g., a cooling and/or purge fluid source. This working fluid source 116 may be configured as or otherwise includes a working fluid reservoir (e.g., a tank, a pressure vessel, etc.) and/or a working fluid flow regulator (e.g., a valve). The reservoir is configured to contain a working fluid; e.g., a cooling and/or purge fluid. Examples of the working fluid include, but are not limited to, cool dry air, nitrogen ($N_2$) gas, argon (Ar) gas or another inert gas. The flow regulator is configured to selectively direct (e.g., flow, meter, etc.) the working fluid from the reservoir to the fluid channels 64 (see FIGS. 3 and 4). This working fluid source 116 of FIG. 1 is fluidly coupled to the fluid channels 64 (see FIGS. 3 and 4) through at least one conduit 118; e.g., hypo-tubing, a pipe, a hose, etc. The conduit 118 projects into the receptacle 62 and may be attached (e.g., brazed, adhered or otherwise bonded) to the probe housing 32 and its back endwall 56. The conduit 118 may thereby direct the working fluid into the fluid channels 64 (see FIGS. 3 and 4) through the receptacle 62. Here, the back-end portion 106 of the sensor optics 96 and the respective back-end optical sheath 100 may be routed through the conduit 118 to the probe housing 32. As the working fluid flows through the fluid channels 64, the working fluid may cool the probe housing 32 as well as the sensor optics 96. This working fluid may then be directed out of the fluid channels 64 into the gap between the probe(s) 34 and/or 36 and the respective rotor blade 24 and its blade tip 26 to purge (e.g., displace, flush out, remove) any debris (e.g., electrically conductive contaminants, etc.) in that gap. This purging may clean an end of the sensor optics 96. The purging may also or alternatively maintain dielectric strength between the capacitance probe 34 and the respective rotor blade 24 and its blade tip 26 which may otherwise be diminished by the presence of the debris.

In some embodiments, referring to FIG. 1, the probe housing 32 may be divided into a housing base 120 and a housing cover 122. The housing cover 122 may be removed from the housing base 120 for installation of the capacitance sensor 88 into the housing cavity 58. The housing cover 122 may subsequently be bonded and/or otherwise attached to the housing base 120 to form the probe housing 32. The present disclosure, however, is not limited to such an exemplary arrangement.

Figure 9:
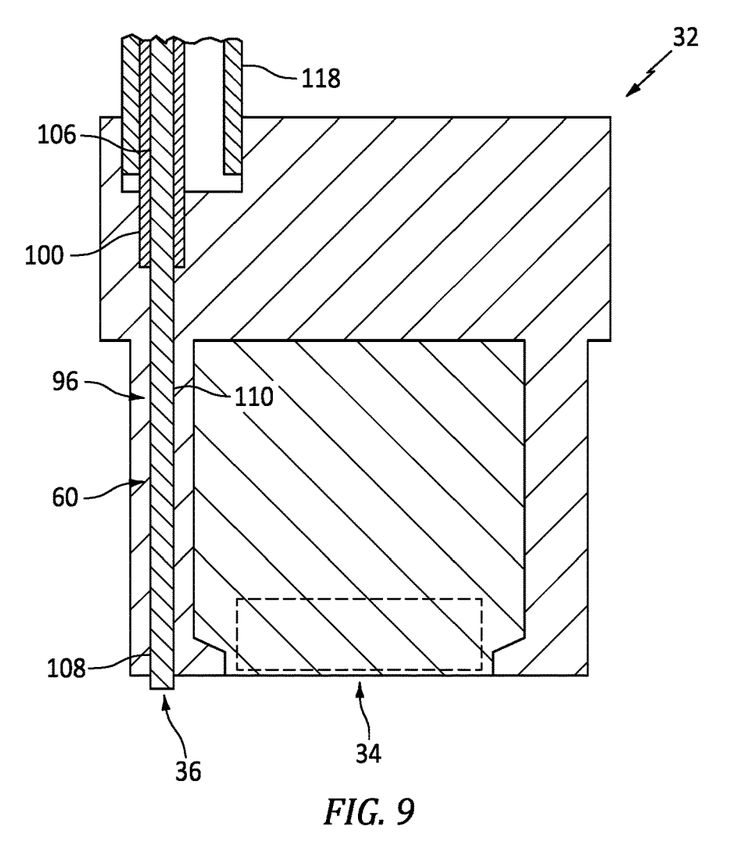
FIGS. 9 and 10 are partial sectional illustrations of the measurement system with various optical sheath arrangements.
Figure 10:
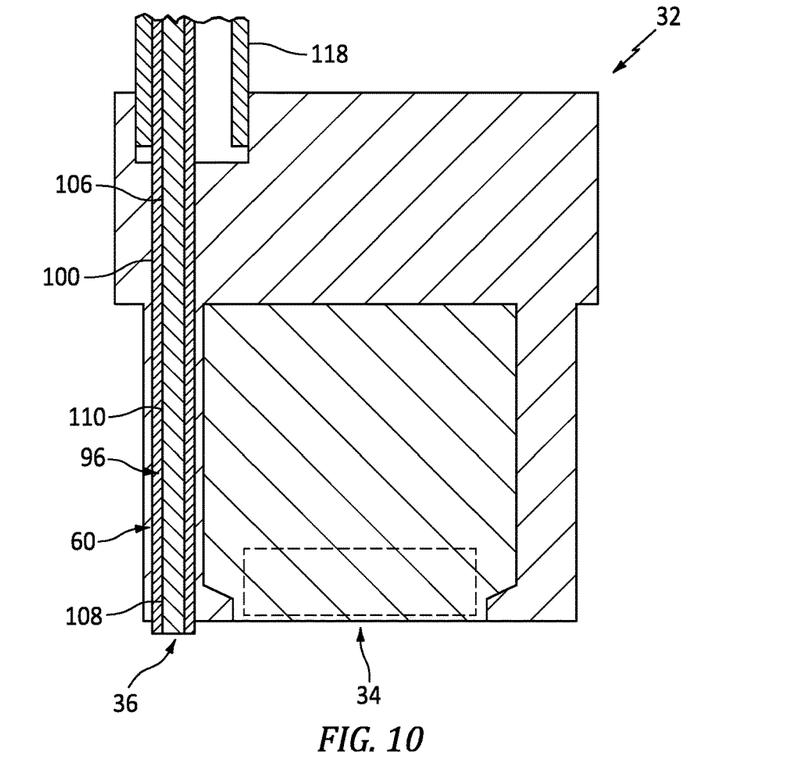

In some embodiments, referring to FIG. 1, the face-end portion 108 of the sensor optics 96 may be sheathed. In other embodiments, referring to FIG. 9, this face-end portion 108 may alternatively be unsheathed. In still other embodiments, referring to FIG. 10, the sensor optics 96 may be completely sheathed with the optical sheath 100 axially through the probe housing 32.

Figure 11:
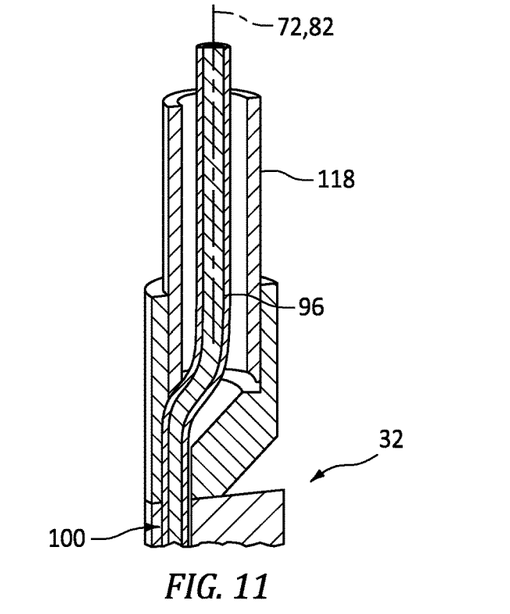
FIG. 11 is a perspective cutaway illustration of a portion of the measurement system.

In some embodiments, referring to FIG. 1, the conduit 118 and the optical probe members 96 and 100 may be non-coaxial outside of the probe housing 32. In other embodiments, referring to FIG. 11, the optical members 96 and 100 may alternatively be arranged coaxial with the conduit 118 outside of the probe housing 32.

In some embodiments, referring to FIG. 3, the probe housing 32 include the fluid channels 64 for directing the working fluid through the probe housing 32 and to a location proximate the sensor optics end 112 (see FIG. 1). It is contemplated, however, the probe housing 32 may be configured without these fluid channels 64 in other embodiments.

The measurement system 20 is described above as including the capacitance probe 34 with its capacitance sensor 88. The measurement system 20 of the present disclosure, however, is not limited to such an exemplary field probe and sensor arrangement. The field probe (e.g., element 34), for example, may alternatively be configured as or otherwise include an eddy-current probe. The field sensor (e.g., element 88) may alternatively be configured as or otherwise include an eddy-current sensor.

Figure 12:
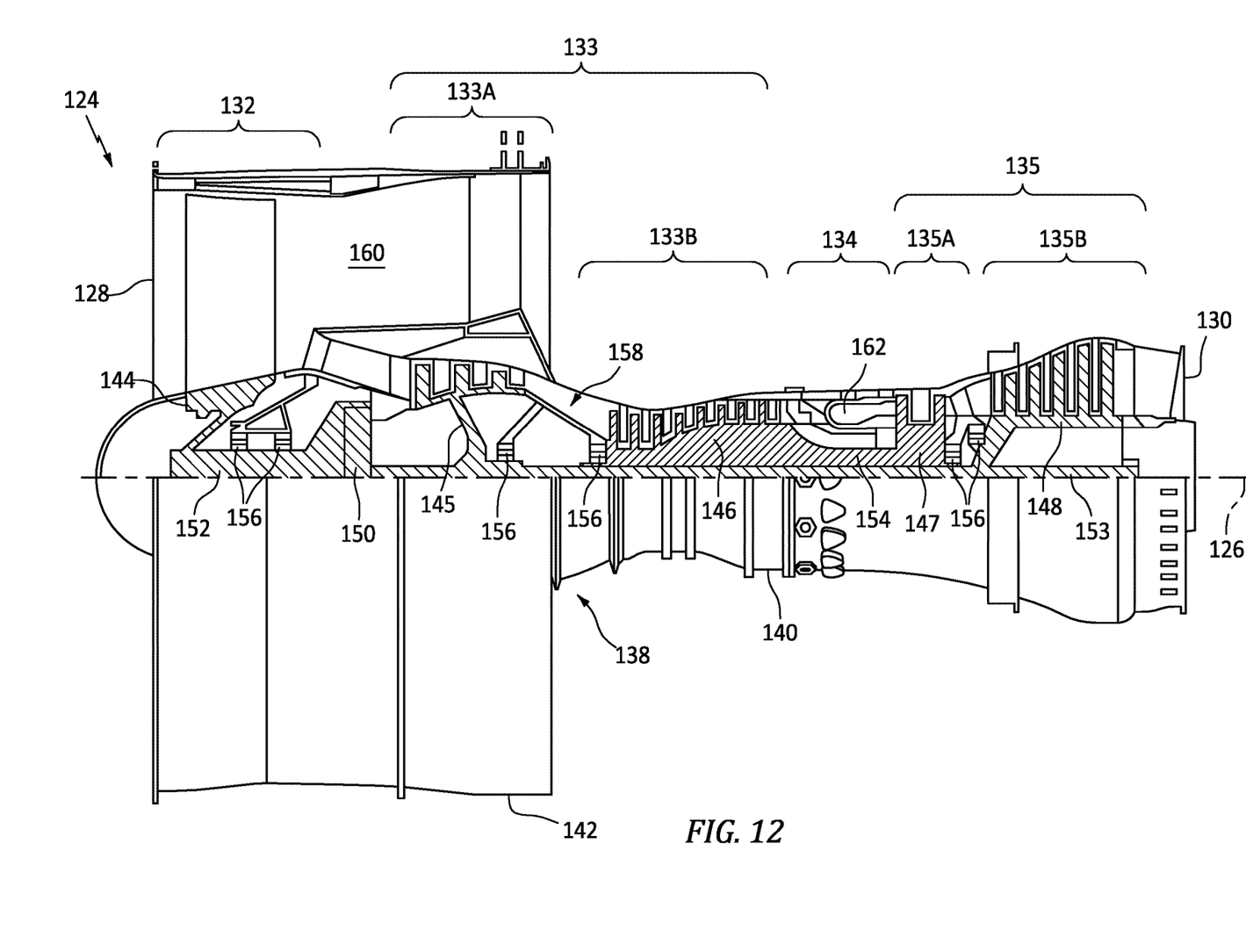
FIG. 12 is a side cutaway illustration of a geared turbine engine.

FIG. 12 illustrates a gas turbine engine 124 with which the measurement system 20 of FIG. 1 may be configured. The turbine engine 124 extends along a centerline axis 126 between an upstream airflow inlet 128 and a downstream airflow exhaust 130. The turbine engine 124 includes a fan section 132, a compressor section 133, a combustor section 134 and a turbine section 135. The compressor section 133 includes a low pressure compressor (LPC) section 133A and a high pressure compressor (HPC) section 133B. The turbine section 135 includes a high pressure turbine (HPT) section 135A and a low pressure turbine (LPT) section 135B.

The engine sections 132-135B are arranged sequentially along the centerline axis 126 within an engine housing 138. This engine housing 138 includes an inner case 140 (e.g., a core case) and an outer case 142 (e.g., a fan case). The inner case 140 may house one or more of the engine sections 133A-135B; e.g., an engine core. The outer case 142 may house at least the fan section 132. The duct wall 28 for the measurement system 20 of FIG. 1 may be configured as part of any one of the engine cases 140, 142, or attached to any one of the engine cases 140, 142 or another stationary structure where the duct wall 28 is part of a blade outer air seal (BOAS), for example.

Each of the engine sections 132, 133A, 133B, 135A and 135B includes a respective bladed rotor 144-148. Each of these bladed rotors 144-148 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s). The bladed rotor 22 monitored by the measurement system 20 of FIG. 1 may be the fan rotor 144, the LPC rotor 145, the HPC rotor 146 or any other bladed rotor of the turbine engine 124.

The fan rotor 144 is connected to a geartrain 150, for example, through a fan shaft 152. The geartrain 150 and the LPC rotor 145 are connected to and driven by the LPT rotor 148 through a low speed shaft 153. The HPC rotor 146 is connected to and driven by the HPT rotor 147 through a high speed shaft 154. The shafts 152-154 are rotatably supported by a plurality of bearings 156; e.g., rolling element and/or thrust bearings. Each of these bearings 156 is connected to the engine housing 138 by at least one stationary structure such as, for example, an annular support strut.

During operation, air enters the turbine engine 124 through the airflow inlet 128. This air is directed through the fan section 132 and into a core flowpath 158 and a bypass flowpath 160. The core flowpath 158 extends sequentially through the engine sections 133A-135B. The air within the core flowpath 158 may be referred to as "core air". The bypass flowpath 160 extends through a bypass duct, which bypasses the engine core. The air within the bypass flowpath 160 may be referred to as "bypass air".

The core air is compressed by the LPC rotor 145 and the HPC rotor 146 and directed into a combustion chamber 162 of a combustor in the combustor section 134. Fuel is injected into the combustion chamber 162 and mixed with the compressed core air to provide a fuel-air mixture. This fuel-air mixture is ignited and combustion products thereof flow through and sequentially cause the HPT rotor 147 and the LPT rotor 148 to rotate. The rotation of the HPT rotor 147 and the LPT rotor 148 respectively drive rotation of the HPC rotor 146 and the LPC rotor 145 and, thus, compression of the air received from a core airflow inlet. The rotation of the LPT rotor 148 also drives rotation of the fan rotor 144, which propels the bypass air through and out of the bypass flowpath 160. The propulsion of the bypass air may account for a majority of thrust generated by the turbine engine 124, e.g., more than seventy-five percent (75%) of engine thrust. The turbine engine of the present disclosure, however, is not limited to the foregoing exemplary thrust ratio.

The measurement system 20 may be configured with various turbine engines other than the one described above as well as in other types of (e.g., rotational) equipment. The measurement system 20, for example, may be configured with a geared turbine engine where a geartrain connects one or more shafts to one or more rotors in a fan section, a compressor section and/or any other engine section. Alternatively, the measurement system 20 may be configured with a turbine engine configured without a geartrain. The turbine engine may have a single spool, two spools (e.g., see FIG. 12), or more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A measurement system, comprising:
a probe housing including a sidewall, a cavity and a channel, the sidewall extending circumferentially around and axially along the cavity, and the channel radially outboard of the cavity and extending axially in the sidewall;
a field probe comprising a field sensor disposed in the cavity, the field sensor forming a sensor face; and
an optical probe configured with an optical line of sight through the channel into a volume adjacent the sensor face;
the optical probe comprising an optical fiber at least partially defining the optical line of sight into the volume, the optical fiber extending axially in the channel;
the optical probe further comprising an optical sheath, the optical sheath covering a first portion of the optical fiber and connected to the probe housing, and a second portion of the optical fiber, within the channel, projecting out from the optical sheath towards the volume.

2. The measurement system of claim 1, further comprising a blade tip clearance measurement system comprising the field probe.

3. The measurement system of claim 1, further comprising a blade time of arrival measurement system comprising the optical probe.

4. The measurement system of claim 1, wherein the optical fiber extends through the probe housing to or into the volume.

5. The measurement system of claim 1, wherein
the optical sheath is a first optical sheath, and the optical probe further comprises a second optical sheath;
the second optical sheath covers a third portion of the optical fiber and is connected to the probe housing; and
the second portion of the optical fiber is between the first portion of the optical fiber and the third portion of the optical fiber.

6. The measurement system of claim 1, wherein the optical sheath extends through the channel and to or into the volume.

7. The measurement system of claim 1, wherein
the optical fiber is a first optical fiber, and the optical probe further comprises a second optical fiber at least partially defining a second optical line of sight into the volume; and
the second optical fiber extends axially in the channel.

8. The measurement system of claim 1, wherein
the probe housing further includes a mount projecting out from the sidewall; and
a fastener aperture extends axially through the mount.

9. A measurement system, comprising:
a probe housing including a sidewall, a cavity and a channel, the sidewall extending circumferentially around and axially along the cavity, and the channel radially outboard of the cavity and extending axially in the sidewall;
a field probe comprising a field sensor disposed in the cavity, the field sensor forming a sensor face; and
an optical probe configured with an optical line of sight through the channel into a volume adjacent the sensor face;
wherein the channel is an optical channel, and the probe housing further includes a fluid channel adjacent the optical channel within the sidewall; and
wherein the fluid channel is radially outboard of the cavity and extends axially in the sidewall.

10. The measurement system of claim 9, further comprising a working fluid source fluidly coupled with the fluid channel.

11. The measurement system of claim 9, wherein the optical channel and the fluid channel each extend axially in the probe housing to an end of the probe housing at the sensor face.

12. The measurement system of claim 9, wherein
the probe housing further includes a receptacle at an end of the probe housing; and
the optical channel and the fluid channel each project axially into the probe housing from the receptacle.

13. The measurement system of claim 12, wherein
the fluid channel is a first fluid channel, and the probe housing further includes a second fluid channel adjacent the optical channel within the sidewall; and
the second fluid channel projects axially into the probe housing from the receptacle.

14. The measurement system of claim 13, wherein the optical channel is laterally between the first fluid channel and the second fluid channel.

15. A measurement system, comprising:
a probe housing comprising a cavity;
a blade tip clearance measurement system comprising a first probe, the first probe comprising a first probe sensor that forms a sensor face, and the first probe sensor disposed in the cavity; and
a blade time of arrival measurement system comprising a second probe, the second probe projecting through the probe housing to an end of the probe housing adjacent the sensor face, and the second probe configured discrete from the first probe.

16. The measurement system of claim 15, wherein at least one of
the first probe sensor comprises a field probe; or
the second probe comprises an optical probe.

* * * * *